No. 811,152. PATENTED JAN. 30, 1906.
O. C. KNIPE.
BALL BEARING CASTER.
APPLICATION FILED FEB. 12, 1903.

WITNESSES:

INVENTOR:
Oliver C. Knipe,
by
Atty.

UNITED STATES PATENT OFFICE.

OLIVER C. KNIPE, OF NORRISTOWN, PENNSYLVANIA, ASSIGNOR TO THE PRESSED STEEL MANUFACTURING COMPANY, A CORPORATION OF NEW JERSEY.

BALL-BEARING CASTER.

No. 811,152.     Specification of Letters Patent.     Patented Jan. 30, 1906.

Application filed February 12, 1903. Serial No. 143,147.

*To all whom it may concern:*

Be it known that I, OLIVER C. KNIPE, a citizen of the United States, residing at Norristown, in the county of Montgomery, State of Pennsylvania, have invented certain new and useful Improvements in Ball-Bearing Casters, of which the following is a specification.

This invention relates to casters for furniture, as chairs, tables, or other structures which require shifting about and in which a smooth easy rolling motion is desired.

The object is to provide a ball-bearing as part of such a fixture which will admit of cheap and durable construction.

In carrying out the invention I provide a ball cup or casing permanently fixed to a socket or plate, which admits of easy attachment to the piece of furniture on which it is to be mounted and in which a roller and its stem or support may be mounted. The roller-stem may be detachable by means of a slip-joint, as when a socket to be let into a hole bored in the bottom of the furniture structure is provided, or it may be riveted to the plate which carries the ball-cup when a table type of caster is used. I provide also, by preference, as part of the ball-cup a perforated cone to engage the balls, and especially when the socket type of caster is used, and into which the roller-stem may be set, thus rendering the part most easily damaged capable of ready renewal or repair. The ball cup and cone which form with the caster socket or plate a unitary structure comprise a raceway or ball-cup permanently secured to the socket or plate and a loose hardened-steel cone bearing on the circle of balls, a soft-metal jacket being closed over the parts to act at once as a casing and a retainer for the balls and cone.

The novel features of the invention will be hereinafter more fully described and will be definitely indicated in the claims.

Figure 1:
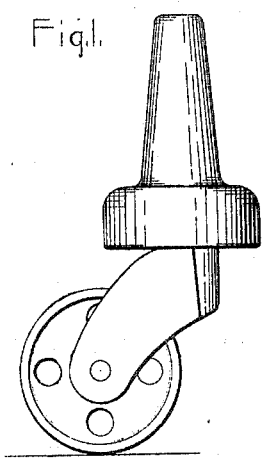
Figure 2:
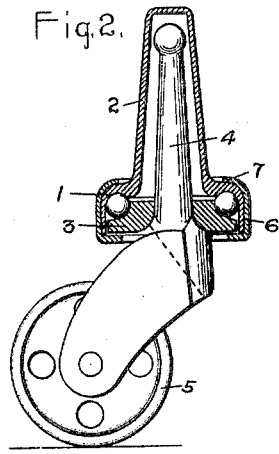
Figure 3:
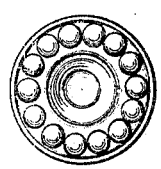
Figure 4:
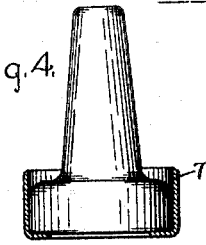
Figure 5:
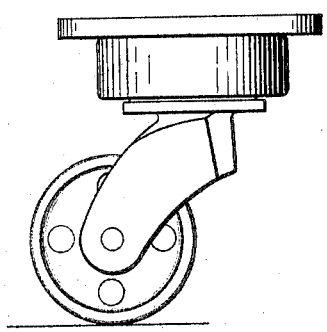
Figure 6:
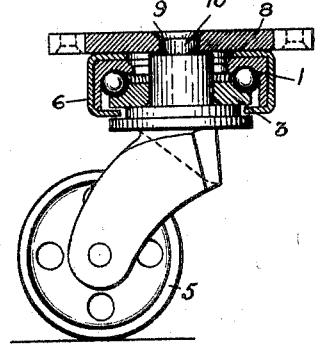

In the accompanying drawings, which illustrate several ways of carrying out the invention, Figure 1 is a side elevation of a caster of the socket type. Fig. 2 is a part-sectional view. Fig. 3 is a face view of the ball-cup. Fig. 4 shows the method of assembling the ball-cup and its casing. Fig. 5 is a side elevation of a caster of the table or plate type, and Fig. 6 is a part-sectional view of such a type as Fig. 5.

Referring first to the socket type of Figs. 1 to 4, 1 represents a cup for a circle of balls, which may be formed in one integral piece with the socket 2, as by casting, drawing, or spinning, or may be formed separately and united therewith by brazing, welding, or otherwise. 3 represents a cone to bear on the balls and which is provided with a tapering hole to accommodate the stem 4 of a cast yoke in which the roller 5 is mounted. The cone forms a permanent part of the ball-bearing and is not detachable therefrom. It is held loosely in place by an inturned edge or flange of a soft-metal jacket 6, fitting snugly over the outside of the ball-cup, as seen at 7, Fig. 4, which may be closed over the upper side of the same by a press. The mode of assembling the parts is seen in Fig. 4, the edge 7 being closed down on the ball-cup after the balls and cone have been set in place.

The ball-bearing *per se* is not claimed herein, as it forms the subject-matter of a companion application, hereinafter referred to.

Thus it will be seen that the ball-bearing, cone, and attached socket may be handled as a single unit, which dispenses with the necessity of the purchaser assembling the parts. Moreover, a simple roller may be used, such as is in common use on most types of caster, facilitating renewal or repair in case of damage to the weakest part.

In Figs. 5 and 6 my improvements are shown as applied to a caster of the table type, which is lagged fast by screws or nails to the legs of a chair or the like. The construction differs in providing a metal plate 8, brazed or riveted to the ball-cup. This plate is provided with a countersunk hole at its center, as seen at 9, into which is loosely riveted the post or stem 10 of the roller. The ball-cup 1 is a case-hardened steel cup, and a soft-metal jacket 6 is closed around it, acting at once as a retainer for the balls and a hardened-steel cone 3. The entire caster, inclusive of the support and ball-bearing and roller, is thus in a single structure, which may be secured to furniture by screws driven through holes in the plate.

No claim is made herein for the combined ball-cup and cone, as this structure is made the subject of my companion application, Serial No. 146,453, filed March 6, 1903.

What I claim as new, and desire to secure by Letters Patent of the United States, is—

1. As an article of manufacture, a ball-bearing support for a caster comprising a ball-cup, a soft-metal jacket attached thereto, a series of balls in the cup, a perforated cone engaging the same, the jacket being provided with an integral incurled flange to act as a cone-retainer, and means adapted to permit mounting the caster-support on an article of furniture.

2. As an article of manufacture, a ball-bearing support for a caster comprising a hollow socket to receive a roller-stem, a ball-cup carried by the lower end of the socket, an inclosed cone and a series of balls mounted to turn freely in the cup, and a soft-metal jacket provided with an inturned integral flange to permanently secure the cone within the cup.

3. A ball-bearing caster comprising a tubular socket having a ball-cup at its lower end, a perforated cone and series of balls permanently inclosed in the ball-cup, a soft-metal jacket having an integral flange to retain the cone, and a roller having a stem set in the cone and projecting into the socket.

In witness whereof I have hereunto set my hand this 6th day of January, 1903.

OLIVER C. KNIPE.

Witnesses:
O. W. PAYRAN,
PHILIP J. DOUGHERTY.